US008447521B2

(12) United States Patent
Tompkins (10) Patent No.: US 8,447,521 B2
(45) Date of Patent: May 21, 2013

(54) SUBSURFACE ELECTRICAL CONDUCTIVITY CONTRAST RECONSTRUCTION USING NARROW-BAND ELECTROMAGNETIC DATA AND FULLWAVE IMAGING (75) Inventor: Michael Tompkins, San Francisco, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 463 days.

(21) Appl. No.: 12/712,346

(22) Filed: Feb. 25, 2010

(65) Prior Publication Data

US 2010/0250141 A1 Sep. 30, 2010

Related U.S. Application Data (60) Provisional application No. 61/160,075, filed on Mar. 13, 2009.

(51) Int. Cl.
*G01V 3/17* (2006.01)
(52) U.S. Cl.
USPC ...................................... 702/7; 702/6; 702/8
(58) Field of Classification Search
USPC ........................... 702/6, 7, 8, 11, 16
See application file for complete search history.

(56) References Cited

U.S. PATENT DOCUMENTS

| | | | |
|---|---|---|---|
| 4,349,781 A * | 9/1982 | Vozoff | 324/346 |
| 6,253,100 B1 | 6/2001 | Zhdanov | |
| 7,191,063 B2 | 3/2007 | Tompkins | |
| 2009/0005993 A1 * | 1/2009 | Abubakar et al. | 702/7 |

OTHER PUBLICATIONS

A. Abubakar et al., "2.5D Forward and Inverse Modeling for Interpreting Low-Frequency Electromagnetic Measurements," Geophysics, v. 73 No. 4, pp. F165-F177 (Jul.-Aug. 2008).
J.F. Claerbout, "Coarse Grid Calculations of Waves in Inhomogeneous Media with Application to Delineation of Complicated Seismic Structure," Geophysics, v. 35 No. 3, p. 407-418 (Jun. 1970).
R.J. Ferguson et al., "Prestack Depth Migration by Symmetric Nonstationary Phase Shift," Geophysics, v. 67 No. 2, pp. 594-603 (Mar.-Apr. 2002).
J. Gazdag, "Wave Equation Migration with the Phase-Shift Method," Geophysics, v. 43 No. 7, pp. 1342-1351 (Dec. 1978).

(Continued)

*Primary Examiner* — Michael Nghiem
*Assistant Examiner* — Paul D Lee
(74) *Attorney, Agent, or Firm* — Jeremy Berman; Darla Fonseca (57) ABSTRACT

Methods and related systems are described for analyzing electromagnetic survey data. Electromagnetic survey data of a subterranean formation is obtained using at least a downhole transceiver deployed in a borehole and a transceiver positioned on the surface or in another borehole. The electromagnetic survey data includes an incident wave component and a scattered wave component. The incident and scattered components are correlated so as to generate an image of the subterranean formation indicating spatial locations of one or more features, for example, electrical properties such as resistivity variations, in the formation. The image is based at least in part on one or more interference patterns of the incident and scattered wave components. The correlation preferably includes generating a simulation of the incident wave component propagated into the formation, and convolving the simulated propagated incident wave component with the scattered wave component. The simulation can be performed using an analytic continuation or a fullwave simulation.

34 Claims, 6 Drawing Sheets

OTHER PUBLICATIONS

S. Lee et al., "Phase-Field Imaging: The Electromagnetic Equivalent of Seismic Migration," Geophysics, v. 52 No. 5, pp. 678-693 (May 1987).

M. Zhdanov et al., "Underground Imaging by Frequency-Domain Electromagnetic Migration," Geophysics, v. 61 No. 3, pp. 666-682 (May-Jun. 1996).

Yanping Guo et al., "3-D Localization of Buried Objects by Nearfield Electromagnetic Holography," Geophysics, v. 63 No. 3, pp. 880-889 (May-Jun. 1998).

B. Biondi et al., "Equivalence of Source-Receiver Migration and Shot-Profile Migration," Geophysics, v. 68 No. 4, pp. 1340-1347 (Jul.-Aug. 2003).

D. Loewenthal et al., "Reversed Time Migration in Spatial Frequency Domain," Geophysics, v. 48 No. 5, pp. 627-635 (May 1983).

T. Madden., "Inversion of Low-Frequency Electromagnetic Data," Oceanographic and Geophysical Tomography, Course 9, Elsevier Science Publishers B.V (1990).

R.H. Stolt, "Migration by Fourier Transfer," Geophysics, v. 43 No. 1, pp. 23-48 (Feb. 1, 1978).

M.J. Tompkins, "Marine Controlled-Source Electormagnetic Imaging for Hydrocarbon Exploration: Interpreting Subsurface Electrical Properties," First Break, v 22 (Aug. 2004).

M.S. Zhdanov et al., "Resistivity Imaging by Time Domain Electromagnetic Migration (TDEMM)," Exploration Geophysics 26, pp. 185-194 (1995).

M.S. Zhdanov et al., "Rapid Seabed Imaging by Frequency Domain Electromagnetic Migration," SEG/Houston Annual Meeting (2005).

YP Velikhov et al., "Interpretation of MHD-sounding data from the Kola Peninsula by the electromagnetic migration method," Physics of the Earth and Planetary Interiors, v 45, No. 2, pp. 149-160 (Mar. 1987).

MS Zhdanov & MA Frenkel, "The solution of the inverse problems on the basis of the analytical continuation of the transient electromagnetic field in the reverse time," Journal of Geomagnetism and Geoelectricity, v 35, No. 11-12, pp. 747-765 (1983).

T Rosten et al., "3-D depth migration operators for marine controlled-source electromagnetic data," SEG Abstracts 25, SEG Annual meeting, New Orleans LA (2006).

JF Claerbout, "Fundamentals of geophysical data processing," McGraw-Hill, Chs 10-11 (1976).

* cited by examiner

*FIG. 5*

SUBSURFACE ELECTRICAL CONDUCTIVITY CONTRAST RECONSTRUCTION USING NARROW-BAND ELECTROMAGNETIC DATA AND FULLWAVE IMAGING

CROSS REFERENCE TO RELATED APPLICATION

This patent application claims benefit of U.S. Provisional Patent Application Ser. No. 61/160,075, filed Mar. 13, 2009, which is incorporated by reference herein.

BACKGROUND

1. Field

This patent specification relates to analyzing subsurface electromagnetic survey data. More particularly, this patent specification relates to methods and systems for analyzing electromagnetic survey data obtained using at least one borehole-deployed receiver to generate an image indicating spatial locations of one or more features in a subterranean formation.

2. Background

Cross borehole (CB), surface-to-borehole (STB), and borehole-to-surface (BTS) electromagnetic (EM) imaging surveys (considered hereinafter as controlled-source electromagnetic (CSEM) data) include a series of electric or magnetic dipole sources that are energized in a borehole, on the surface of the earth, or near the seafloor, and measurements of magnetic and/or electric fields are made in a different borehole, or on the earth's surface or seafloor.

As CSEM surveys increase in demand and size and designs become more complex, there is a need to process and interpret recorded data more quickly and efficiently, perhaps even in real-time. The most common approach to reconstructing subsurface conductivity distributions is CSEM inversion, which results in accurate subsurface models but has timing, stability, and computation limitations.

In the past thirty years, downward continuation imaging methods have been used predominantly for seismic reflection problems. See e.g., Biondi, B, 2003, Equivalence of source-receiver migration and shot-profile migration, *Geophysics*, 68, 1340-1347 (hereinafter "Biondi 2003"), Claerbout, J. F., 1970, Course grid calculations of wave in inhomogeneous media with application to delineation of complicated seismic structure, *Geophysics*, 35, 407-418 (hereinafter "Claerbout 1970"), Claerbout, J. F., 1976, *Fundamentals of Geophysical Data Processing*, McGraw-Hill, New York, Chpts. 10-11, Ferguson, R. J., & Margrave, G. F., 2003, Prestack depth migration by symmetric non-stationary phase shift, *Geophysics*, 67, 594-603, Gazdag, J., 1978, Wave equation migration with the phase shift method, *Geophysics*, 43, 1342-1351, Loewenthal D., & Mufti, I. R., 1983, Reversed time migration in spatial frequency domain, *Geophysics*, 48, 627-635, and Stolt, R. H., 1978, Migration by fourier transform, *Geophysics*, 43, 23-48.

However, there are several early studies that formulate this imaging problem for broadband passive-source EM data. See, Lee, S., McMechan, G. A., & Aiken, C. L., 1987, Phase-field imaging: The electromagnetic equivalent of seismic migration, *Geophysics*, 52, 678-693 (hereinafter "Lee 1987"), Levy, S., Oldenburg, D., & Wang, J., 1988, Subsurface imaging using magnetotelluric data. *Geophysics*, 53, 104-117 (hereinafter "Levy 1988"), Madden, T., 1988, Inversion of low-frequency electromagnetic data, Course Notes, 9, Dept. of Earth, Atmospheric, and Planetary Sciences, MIT, 379-408, Velikhov, Y. P., Zhdanov, M. S., & Frenkel, M. A., 1987, Interpretation of MHD-sounding data from the Kola Peninsula by the electromagnetic migration method, *Physics of the Earth and Planetary Interiors*, 45, 149-160, and Zhdanov, M. S., Traynin, P., & Booker, J. R., 1996, Underground imaging by frequency-domain electromagnetic migration, *Geophysics*, 61, 666-682 (hereinafter "Zhadanov 1996"). All these papers are applied to the magnetotelluric (MT) problem, while additional works describe the use of EM imaging for broadband time-domain electromagnetic soundings. See, Zhdanov, M. S. & Frenkel, M. A., 1983, The solution of the inverse problems on the basis of the analytical continuation of the transient electromagnetic field in reverse time, *Journal of Geomagnetism and Geoelectricity*, 35, 747-765, Zhdanov, M. S., Traynin, P., & Portniaguine, O., 1995, Resistivity imaging by time domain electromagnetic migration (TDEMM). *Exploration Geophysics* 26, 186-194, and Zhdanov, M. S., & Portniaguine, O., 1997, Time-domain electromagnetic migration in the solution of inverse problems. *Geophysical Journal International*, 131, 293-309. For a discussion of the application of narrow-band downward continuation imaging to surface CSEM data interpretation for land surveys, see, Velikhov, Y. P., Zhdanov, M. S., & Frenkel, M. A., 1987, Interpretation of MHD-sounding data from the Kola Peninsula by the electromagnetic migration method, *Physics of the Earth and Planetary Interiors*, 45, 149-160. Also see, Tompkins, M. J., 2004, Marine controlled-source electromagnetic imaging for hydrocarbon exploration: Interpreting subsurface electrical properties, *First Break*, 22, 45-51 (hereinafter "Tompkins 2004") for a discussion to marine surveys. In the past several years, there have been additional studies on the use of downward continuation imaging to the marine CSEM problem (Rosten, T., Hogstad, K., & Arntsen, B., 2006, 3D depth migration operators for marine controlled-source electromagnetic data, *SEG Abstracts*, 25, 770-774, and Tompkins, M. J., 2005, The role of vertical anisotropy in interpreting marine controlled-source electromagnetic data, *SEG Expanded Abstracts*, 24, 514-517 (hereinafter "Tompkins 2005"), and Zhdanov, M. S., & Wan, L., 2005, Rapid seabed imaging by frequency domain electromagnetic migration, *SEG Expanded Abstracts*, 518-521 (hereinafter "Zhdanov 2005")). In contrast to analytic continuation methods that use plane wave extrapolation to propagate the wave fields into the earth, fullwave imaging methods have also been applied to land (Zhdanov, M. S., Traynin, P., & Portniaguine, O., 1995, Resistivity imaging by time domain electromagnetic migration (TDEMM). *Exploration Geophysics* 26, 186-194, and Zhdanov, M. S., & Portniaguine, O., 1997, Time-domain electromagnetic migration in the solution of inverse problems. *Geophysical Journal International*, 131, 293-309) and marine (see, Mittet, R., Maao, F., Aakervik, O. M., & Ellingsrud, S., 2005, A two-step approach to depth migration of low-frequency electromagnetic data, 24, 522-525 (hereinafter "Mittet 2005")) CSEM data).

Two patents teach methods that relate to CSEM imaging (i.e., migration, holography). They are U.S. Pat. No. 7,191,063 ("the '063 patent") and U.S. Pat. No. 6,253,100 ("the '100 patent"). The '100 patent discusses steps in a method of surface CSEM imaging for broadband signals including time-domain and frequency-domain transmissions. Specifically, the '100 patent discusses the steps of incident and scattered field separation, signal propagation in a medium, and application of an imaging condition (cross-correlation). The '100 patent further teaches CSEM imaging using fullwave formulations of both electric and magnetic fields. The '063 patent discusses downward continuation imaging for narrow-band marine CSEM data using between 3 and 15 frequencies. Both the '100 patent and the '063 patent discuss iterative imaging methods. Although not disclosed in a patent, Mittet 2005, discusses an application of fullwave imaging to narrow-band surface CSEM data using a modified imaging condition. However, none of these patents or publications discuss CSEM imaging methods applied to cross-well (xwell), borehole-to-surface (BTS), or surface-to-borehole (STB) configurations.

SUMMARY

According to some embodiments, a method of analyzing electromagnetic survey data is provided. The method includes receiving electromagnetic survey data of a subterranean formation obtained using at least a first downhole transceiver deployed in a borehole and a second transceiver. The electromagnetic survey data includes an incident wave component and a scattered wave component. The incident and scattered components are correlated so as to generate an image of the subterranean formation indicating spatial locations of one or more features, for example, electrical properties such as resistivity variations, in the formation. The image is based at least in part on one or more interference patterns of the incident and scattered wave components.

The correlation preferably includes generating a simulation of the incident wave component propagated into the formation, and convolving the simulated propagated incident wave component with the scattered wave component. The simulation can be performed using an analytic continuation or a fullwave simulation. The electromagnetic survey data preferably primarily includes narrow frequency ranges. The first transceiver can be either a transmitter or a receiver, and the second transceiver can be located in another borehole, on land or in water in a marine environment.

According to some embodiments, a system is also provided for analyzing electromagnetic survey data. The system includes a processing system configured and programmed to receive electromagnetic survey data of a subterranean formation obtained using at least a first downhole transceiver deployed in a borehole and a second transceiver. The electromagnetic survey data includes an incident wave component and a scattered wave component. The processing system is also configured and programmed to correlate the incident and scattered components so as to generate an image of the subterranean formation indicating spatial locations of one or more features in the formation, being based at least in part on one or more interference patterns of the incident and scattered wave components.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein.

DETAILED DESCRIPTION OF THE PREFERRED EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

According to some embodiments, systems and methods are described herein that relate to cross borehole (CB), surface-to-borehole (STB), and borehole-to-surface (BTS) electromagnetic (EM) imaging surveys (all considered herein as controlled-source electromagnetic (CSEM) data) whereby a series of electric or magnetic dipole sources are energized in a borehole, on the surface of the earth, or near the seafloor, and measurements of magnetic and/or electric fields are made in a different borehole, or on the earth's surface or seafloor.

Figure 1A:
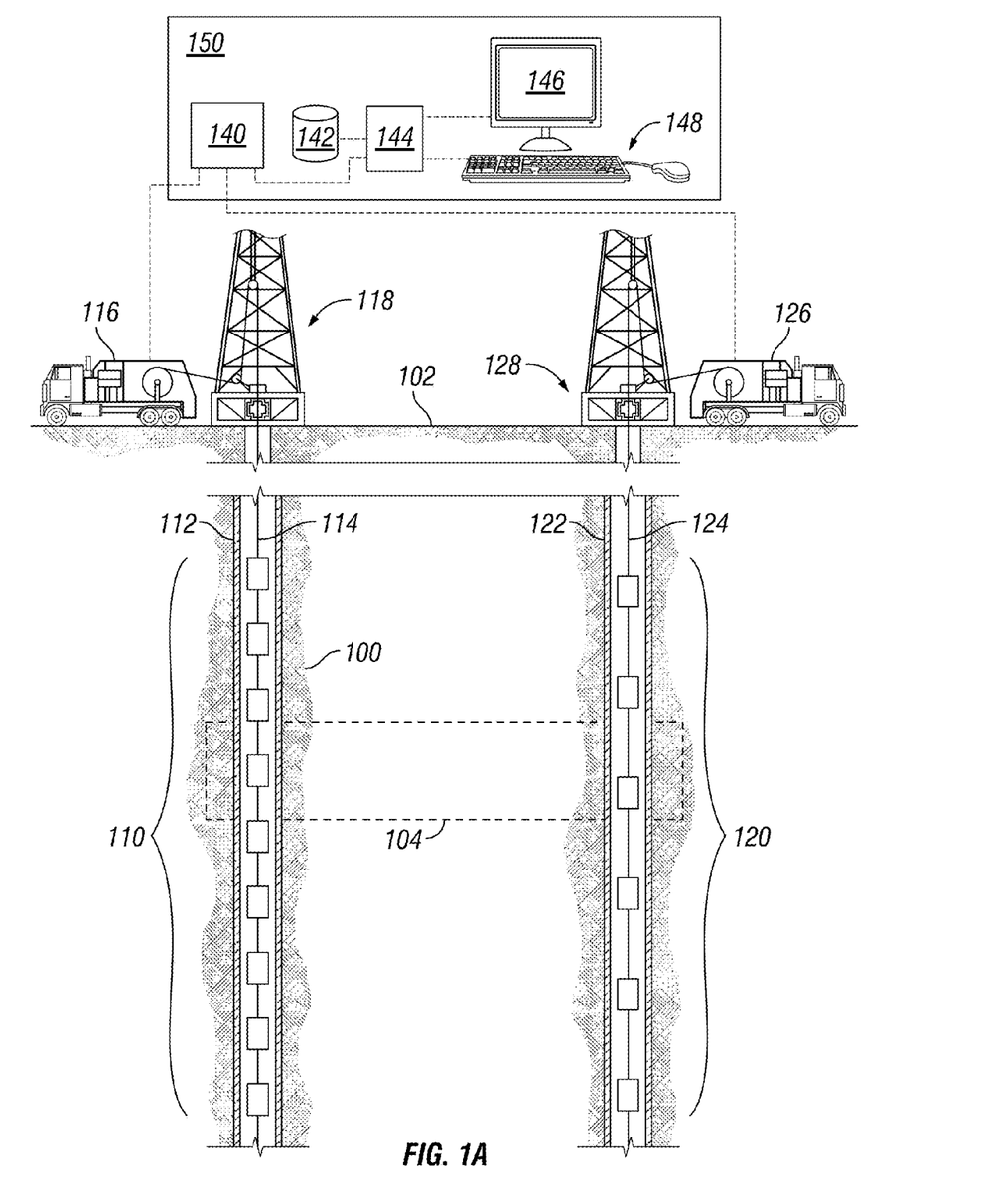
FIGS. 1a-c are schematic drawings illustrating different source-receiver array geometries, according to some embodiments.
Figure 1B:
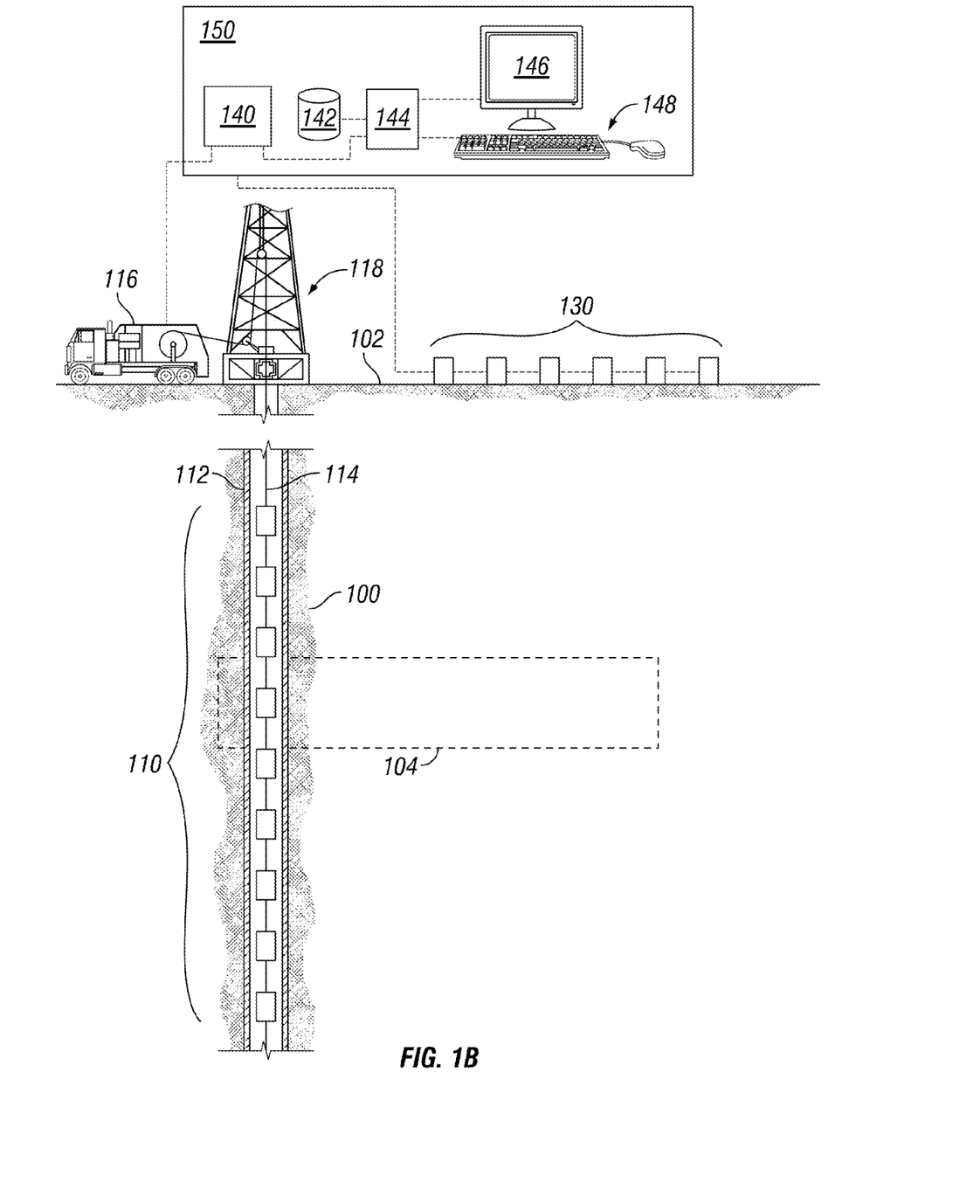
Figure 1C:
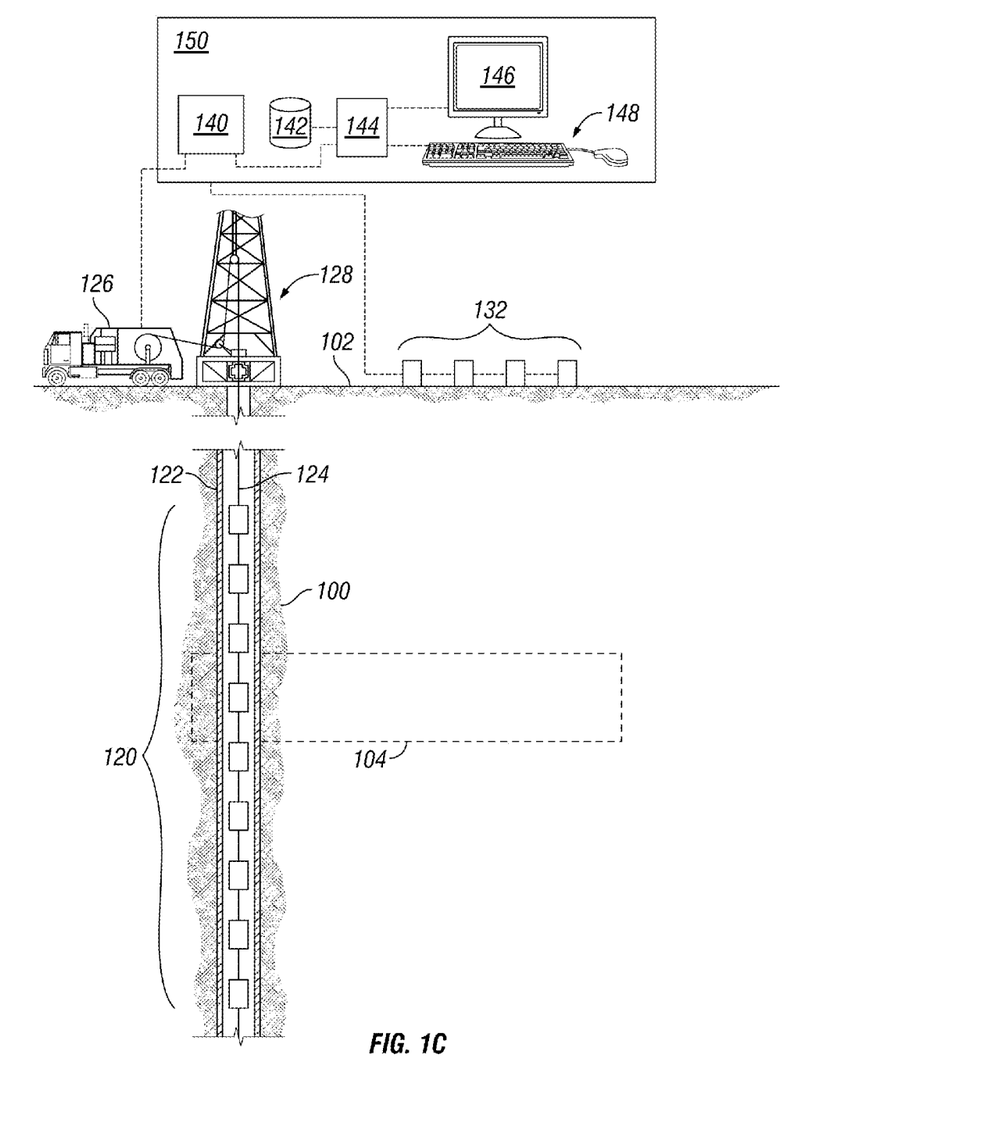

FIGS. 1a-c are schematic drawings illustrating different source-receiver array geometries, according to some embodiments. FIG. 1a, shows a cross borehole configuration in which an array of electromagnetic sources 110 deployed in a borehole 112, and an array of electromagnetic field receivers 120 deployed in a borehole 122. Sources 110 are deployed via a wireline 114 from wireline truck 116 at wellsite 118 on the surface 102. Similarly, receivers 120 are deployed via a wireline 124 from wireline truck 126 at wellsite 128. FIG. 1b shows a borehole-to-surface configuration in which electromagnetic sources 110 are deployed in borehole 112, and an array of electromagnetic field receivers 130 are deployed on the surface 102. FIG. 1c shows a surface-to-borehole configuration in which electromagnetic field receivers 120 are deployed in borehole 122, and an array of electromagnetic sources 132 are deployed on the surface 102.

Also shown in FIGS. 1a-c is a processing center 150 which includes one or more central processing units 144 for carrying out the data processing procedures as described herein, as well as other processing. Processing center 150 also includes a storage system 142, communications and input/output modules 140, a user display 146 and a user input system 148. According to some embodiments, processing center 150 can be included in one or both of the logging trucks 116 and 126, or may be located in a location remote from the wellsites 118 and 128. Although the surface 102 is shown in FIGS. 1a-c as being a land surface, according to some embodiments, the region above the surface 102 can be water as in the case of marine applications. For example, for the BTS and STB cases shown in FIGS. 1b and 1c respectively, surface 102 is the sea floor and receivers 132 and sources 130 are deployed from a vessel.

Boreholes 112 and 122 are formed within a subterranean formation 100, and can be open (i.e. uncased), cased with a non-conductive liner such as fiberglass, or cased with a conductive material such as steel. According to some embodiments, for a controlled-source electromagnetic survey, the sources 110 and 132 are polarized electric or magnetic dipole sources. In the case of surface sources 132, according to some embodiments, are either deep-towed or stationary sources. According to some embodiments, the sources 110 and 132 are used to excite band-limited low-frequency (for example ~0.01-3 kHz) electromagnetic signals. These signals propagate through the subsurface and are perturbed by geologic variation to depths of several km. According to some embodiments, receivers 120 and 130 are spatially-distributed, multi-component, broad-band receivers record the electromagnetic energy. According to some embodiments, transmitted and recorded signals can be electric fields, magnetic fields, or a combination of both.

According to some embodiments, the CSEM survey is used to non-intrusively provide an image of formation resistivity, including for example the location of resistors such as hydrocarbon bearing reservoirs, gas injection zones, and fresh-water aquifers, and conductors such as those produced by the presence of saline water, mineralized zones, and shale or clay. These images allow for the characterization of hydrocarbon reservoirs and ground-water aquifers, for locating bypassed oil, for monitoring reservoir production, groundwater and gas injection process, or for imaging saltwater intrusion into aquifers.

According to some embodiments, CSEM imaging approaches are described which can be an alternative to subsurface electrical conductivity reconstruction, and can be both faster and more stable than CSEM inversion. In general, imaging methods implement the concept that an incident wave, interacting with an object of varying physical property, has a signal coherent with that of the wave scattered from that same point (i.e., law of energy continuity). Therefore, if we have an estimate of the background medium properties (in the absence of any scatterer) and a method (such as governing equations) by which we can simulate the incident and scattered fields in the earth, we can estimate the properties of all scatterers by determining where the incident and scattered fields are coherent. Practically speaking, we use cross-correlation or convolution (time-domain) or multiplication (frequency domain) of the incident and scattered fields at points in the medium to produce these coherency maps (i.e., images). Although all imaging schemes use this concept, they vary in their methods to achieve each step.

In algorithmic terms, the CSEM imaging, or migration, solution attempts to reconstruct subsurface conductivity contrasts by: separating EM wavefields into transmitted (incident) and recorded (scattered) components, propagating the transmitted and received signals into the earth using numerical simulation, convolving the propagated incident and scattered signals (i.e., imaging condition), and summing the results as a function of transmission frequency and source-receiver offset. See, e.g. Biondi 2003 and Claerbout 1970, both of which are incorporated herein by reference. The image results from the interference pattern of the incident and scattered waves and indicates spatial locations of contrasts in electrical properties. According to some embodiments, the propagation of the fields into the earth is performed using analytic continuation (plane wave). According to some other embodiments, the propagation of the fields into the earth is performed using fullwave simulation. Analytic continuation uses migration operators (e.g., phase filters) based on plane wave approximations to more efficiently propagate fields in complex media, while fullwave simulation methods propagate fields based on direct solutions to the Helmholtz equations. In general, analytic imaging is known as downward continuation or one-way migration, and fullwave imaging is known as two-way or fullwave migration.

The methods described according to many embodiments have several advantages over CSEM inversion. One important advantage is that imaging solutions involve only forward numerical simulations and are stable. This is in contrast to inverse solutions that require direct or indirect matrix inversion and are inherently unstable. Unlike imaging, inversions typically require regularization involving smoothness or structural constraints, which may or may not accurately represent subsurface electrical properties. Another advantage for imaging includes the lack of ad hoc parameter adjustments (e.g., regularization trade-off parameters, frequency weightings, and data weightings) compulsory for inverse solutions. One potential drawback of some imaging solutions is that they may not result in estimations of absolute subsurface conductivity.

According to some embodiments, the use of both a general fullwave CSEM imaging method as well as a downward continuation scheme for the recording geometries shown in FIGS. 1a-c are described.

Two examples are also provided that further demonstrate the methods for the CSEM resistivity imaging problem.

According to some embodiments an imaging method using recorded CSEM data to reconstruct subsurface resistivity variations will now be described in further detail. The method is based on the idea of wavefield imaging (i.e., migration or holography) as it applies to narrow-band controlled-source electromagnetic data interpretation, including marine and land-based surface-to-borehole, and cross-well survey configurations.

Figure 5:
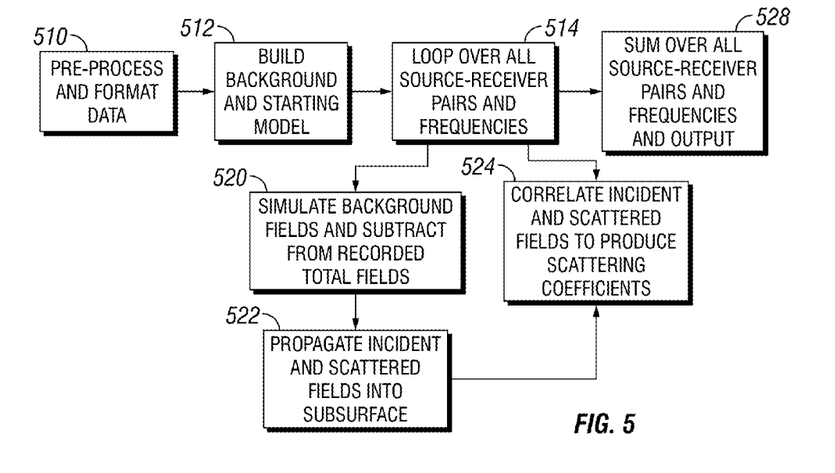
FIG. 5 is a flow chart showing main steps in an imaging method using recorded EM data to reconstruct subsurface resistivity variations, according to some embodiments

FIG. 5 is a flow chart showing main steps in an imaging method using recorded EM data to reconstruct subsurface resistivity variations, according to some embodiments. There are four main steps to the method: estimation of observed scattered fields from total recorded signals (step 520), forward and backward propagation of incident and scattered fields, respectively, into the subsurface (step 522), application of an imaging condition to correlate the incident and scattered fields everywhere in the subsurface (step 524), and summation of correlated subsurface fields for all source-receiver pairs and recorded frequencies (step 526). Those of skill in the art will recognize that this method is applicable for any measured CSEM component (x, y, or z-polarized) and any combination of transmitted or measured time-varying EM fields (electric, magnetic, or both). In the following formulations, we use electric fields, E, to denote, in general, the use of either electric or magnetic fields.

Estimation of Measured Scattered Fields (step 520). According to some embodiments, it is important for CSEM imaging, to remove the portion of the observed field that has not interacted with conductivity contrasts in the earth. To do this, the primary field is estimated at the receiver and subtracted from the observed total field (eqn. 1). Step 520 is performed by approximating (via an estimated earth model) primary recorded signals (at all source-receiver pairs and frequencies using a background 1D, 2D, or 3D earth model containing air and/or seawater, and overburden conductivity) and subtracting this from the recorded total electromagnetic fields (eqn. 1). Numerical methods well known in the field are employed for simulating the background fields and are not described in detail here. See, for example, Abubakar, A., Habashy, T., Druskin, V. L., Knizhnerman, L., & Alumbaugh, D., 2008, Two-and-half dimensional forward and inverse modeling for the interpretation of low-frequency electromagnetic measurements, *Geophysics*, v. 73, No. 4, F165-F177, hereinafter "Abubakar 2008", and incorporated herein by reference. The signal resulting from the subtraction of these background fields, $\langle E_{prim} \rangle$, constitutes the estimated scattered field signal that will be employed in subsequent steps of the method:

$$\langle E_{scat} \rangle = E_{meas} - \langle E_{prim} \rangle. \quad (1)$$

Figure 2:
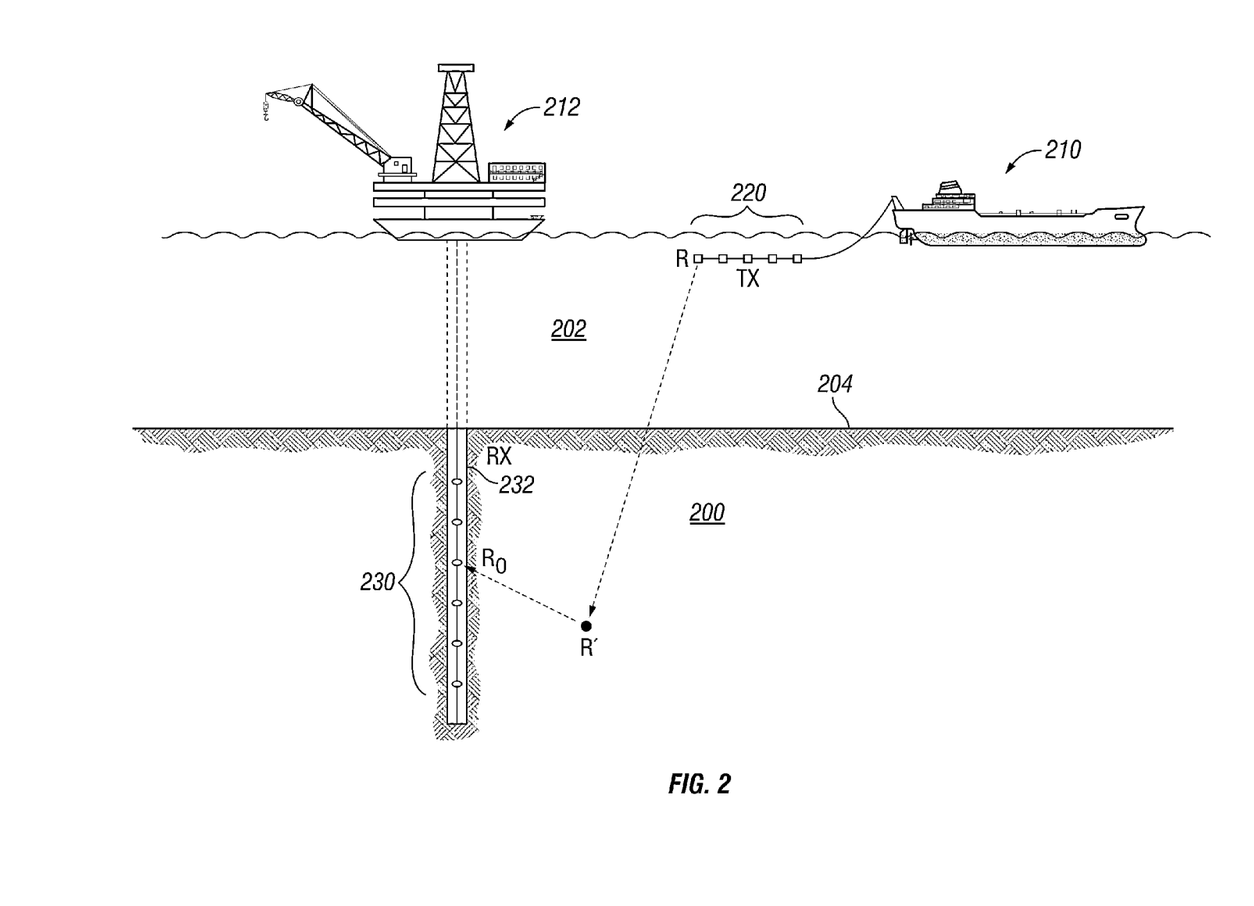
FIG. 2 is a schematic showing a CSEM source-receiver pair and their geometric relation to a conductivity scatterer for a surface-to-borehole CSEM, according to some embodiments.

Propagation of Incident and Scattered Fields (step 522). As mentioned herein, the imaging solution is based on the solution for the incident (i.e., fields that have propagated from the source to all points in the earth) and scattered (i.e., fields that have propagated from a conductivity contrast in the earth to the receiver) wave fields at all points in the subsurface. FIG. 2 is a schematic showing a CSEM source-receiver pair and their geometric relation to a conductivity scatterer for surface-to-borehole CSEM, according to some embodiments. The vessel 210 is towing a number of EM sources 220, including source r, in the sea 202 above seabed 204. A number of receivers 230, including receiver $r_0$, are deployed in a borehole 232 via platform 212. Subsurface scattering point r' is shown in formation 200. Although a marine deployment is illustrated in the embodiment shown in FIG. 2, according to other embodiments, the arrangement is deployed on land and transition zones. The scattered fields are actually represented by Green's functions ($G_{scat}(r',r_0)$) from subsurface scattering point, r', to the receiver, $r_0$. However, we can compute the equivalent scattered electric fields ($E_{scat}(r_0,r')$) that have been backward propagated from the receivers to all subsurface scatterers. This equivalence comes from reciprocity and the fact that the scattered electric fields are complex conjugates of the Green's functions:

$$E_{scat}(r_0,r') = G_{scat}^*(r',r_0).$$

In this embodiment, the method numerically determines both the forward and backward propagated fields using full-wave simulation and the Helmholtz equation:

$$\nabla \times \nabla \times E_{inc} - k^2 E_{inc} = S, \quad (2a)$$

$$\nabla \times \nabla \times E_{scat} - k^2 E_{scat} = \langle E_{scat} \rangle, \quad (2b)$$

where k is the scalar wavenumber, and E is the vector EM field (electric of magnetic). As in Step 520 of FIG. 5, we solve eqn. (2), using well-known numerical methods (e.g., Abubakar 2008), in order to calculate, separately, the incident ($E_{inc}$) or scattered ($E_{scat}$) fields in the subsurface with a unit dipole (S) or scattered field ($\langle E_{scat} \rangle$) source, respectively.

Downward Continuation Propagation (step 522). According to some embodiments, an alternative for the propagation of incident and scattered fields is to use downward continuation to propagate only a portion of the fields into the subsurface. (e.g., Guo, Y., Ko, H. W., & White, D. M., 1998, 3D localization of buried objects by nearfield electromagnetic holography, *Geophysics*, 63, 880-889, Lee 1987, Levy 1988, the '063 patent, and Zhdanov 1996, all of which are incorporated by reference herein).

To illuminate the difference between the two alternative methods, one can look at a single component of the fields from (eqn. 2) and write the full scalar wave equations as:

$$\left[\frac{\partial^2}{\partial x^2} + \frac{\partial^2}{\partial y^2} + \frac{\partial^2}{\partial z^2}\right] E_{inc} - k_z^2 E_{inc} = 0; \quad (3a)$$

$$\left[\frac{\partial^2}{\partial x^2} + \frac{\partial^2}{\partial y^2} + \frac{\partial^2}{\partial z^2}\right] E_{scat} - k_z^2 E_{scat} = 0, \quad (3b)$$

where it has been assumed that there are no macroscopic charge gradients (i.e., $\nabla \cdot E = 0$). In contrast to fullwave imaging, downward continuation makes the limiting assumption of plane-wave propagation resulting in a source-free scalar wave equation of the form:

$$\frac{\partial^2 E}{\partial z^2} - k_z^2 E = 0, \quad (4)$$

Where E is the scalar electric field, and $k_z = \sqrt{i\omega\mu\sigma + k_x^2 + k_y^2}$ is the vertical wavenumber. Plane wave solutions to this equation come in the form of:

$$E_{inc}(k_x, k_y, z) = E_{inc}(k_x, k_y, z-dz)e^{-i\Sigma_i k_z dz}; \quad (5a)$$

$$E_{scat}(k_x, k_y, z) = E_{scat}(k_x, k_y, z-dz)e^{i\Sigma_i k_z dz}, \quad (5b)$$

where dz is the depth increment, $E_{inc}$, and $E_{scat}$ represent the incident and scattered scalar wave components. Of significance is that at any depth, E can be separated into an increasing exponential and a decreasing exponential. Thus, the total wavefield can be divided into directional components, up-going (positive exponential) and down-going (negative exponential) at any subsurface location. If it is assumed that plane waves are propagating from any source position to a receiver, then the wavefields at any point along its path can be computed (extrapolated) using a known distribution of subsurface properties (i.e., $k_z$) and one of the solutions in eqn. (5). It should be noted that the growing exponential extrapolation in eqn. (5b) is unstable, but if only the real part of wavenumber, $k_z$ is considered, the stable complex conjugate of the exponential can be used to extrapolate. This is the nature of the phase-field imaging used by Lee 1987, the '063 patent, and Zhdanov 1996, all of which are incorporated by reference herein. The exponentials can be considered propagators, f-k migration filters, or phase-shift operators. This type of downward continuation is limited since it is only one-way; the fields at any depth point only depend on the field components for depths above. Although eqn. (5) is limited to 1-D extrapolation (layered background media), the field amplitude coefficients themselves, $E_{inc}$ and $E_{scat}$, can be computed in 2D as in the '063 patent or 3D as shown in Rosten, T., Hogstad, K., & Arntsen, B., 2006, 3D depth migration operators for marine controlled-source electromagnetic data, *SEG Abstracts*, 25, 770-774 (hereinafter "Rosten 2006"), both of which are incorporated herein by reference. Rosten 2006 also discusses an extension to this approach, which relaxes the phase-only imaging stipulation and replaces the 1D propagators in (5) by 3D propagators.

Application of Imaging Condition (step 524). Once the incident and scattered fields are computed everywhere in the subsurface for individual frequencies and source-receiver pairs, the two fields are correlated (multiplied in frequency domain) according to an imaging condition. Based on work by Biondi 2003 and Claerbout 1970, the CSEM imaging condition for each source-receiver pair can be stated as:

$$I|_{Rx}^{Tz} = \Re\left[\sum_{freq=1}^{N} E_{inc}(x, y, z, \omega) \cdot E_{scat}(x, y, z, \omega)\right], \quad (6)$$

where I represents the resulting real-valued image for individual source (Tx) and receiver (Rx) pairs. $E_{inc}$ and $E_{scat}$ represent the complex-valued, frequency-domain, incident and scattered scalar wavefields, respectively, and the summation is performed over frequency. The subsurface dimensions are denoted by x, y, and z. This type of imaging condition assumes specular-type reflections, as in seismic imaging, which may be a poor approximation for the limiting case of 1-D resistivity formations (See Mittet 2005, incorporated herein by reference); however, many classes of CSEM problems can successfully use this Claerbout-type imaging condition (see, Tompkins 2004, Tompkins 2005, the '063 patent, and Zhdanov 2005, each of which is incorporated by reference herein).

Now, eqn. (6) looks much like and can be related to a sensitivity equation. Starting with Maxwell's equations and applying a reciprocal Green's function approach (as described above with respect to Step 522), one can show that the sensitivity of an x-polarized electric field with respect to conductivity at an arbitrary subsurface point, (x, y, z), is of the form:

$$\left.\frac{\partial E^x}{\partial \sigma}\right|_{Rx(r_0)}^{Tx(r)} = \int_v [E_{inc}(x, y, z, \omega; r) \cdot E^*(x, y, z, \omega; r_0)] dv, \quad (7)$$

where $E_{inc}$ is the incident vector electric field at point (x, y, z) due to an x-directed dipole at the source location, r, and E* is the total vector electric field at point (x, y, z) due to a dipole at the receiver location, $r_0$. The integration in eqn. (7) is over the representative subsurface domain (e.g., the computational cell). For the imaging problem, propagating the estimated scattered fields as in (eqn. (1)) if of interest, so the total adjoint field, E* should be scaled by an estimate of the scattered surface field, $\langle E_{scat}\rangle$. If a unit volume and sum over recorded frequencies is assumed, a new form of the imaging solution can be written as:

$$\left.\frac{\partial E^x}{\partial \sigma}\right|_{Rx(r_0)}^{Tx(r)} =$$

$$I|_{Rx(r_0)}^{Tx(r)} = \Re[E_{inc}(x, y, z, \omega; r) \cdot E^*(x, y, z, \omega; r_0) \cdot \langle E_{scat}^x(r, r_0, \omega)\rangle], \quad (8)$$

which is equivalent to an expression for the model Jacobian, J(x,y,z), at each subsurface point scaled by a data misfit (eqn. 1).

If the scattered electric field is defined as: $E_{scat} = E^* \cdot \langle E_{scat}^x \rangle$, then eqn. (8) becomes the familiar form of the imaging condition (eqn. 6):

$$I|_{Rx(r_0)}^{Tx(r)} = \Re[E_{inc}(x,y,z,\omega;r) \cdot E_{scat}(x,y,z,\omega;r_0)]. \quad (9)$$

In order to solve the imaging problem in eqn. (8), the incident and scattered fields, at all subsurface points should be computed (propagated) by implementing analytical (1D) or numerical (2D, 3D) solutions to the Helmholtz equations (e.g., see, Abubakar 2008) for each frequency and source-receiver pair as demonstrated with respect to the embodiments of step 522.

Image Summation (step 528). Final CSEM images are created by summing over each frequency and source-receiver pair image to produce the resulting subsurface map detailing the relative contrast in conductivity at each subsurface point (eqn. 8). In addition to computing I as in eqn. (8), we can choose to normalize eqn. (8) by its amplitude before taking its real part: $\Re[I/|I|]$. This amplitude normalization produces a reflection coefficient which is only dependent on the phase difference of the incident and scattered fields, which will be constant for all frequencies at true geo-electric boundaries. This allows for a robust summation over frequency space to estimate these boundaries; however, scattering coefficient magnitude information is lost.

According to embodiments where amplitude normalization is used, the sign but not the magnitude of conductivity contrasts relative to the propagation model is imaged. The final image is a representation of the relative scattering coefficient amplitude, which is proportional to the magnitude of the subsurface conductivity contrasts. However, in this form of the imaging solution there is no constant of proportionality that would allow for a conversion directly to conductivity. The actual conductivity ($\sigma_n$) at each boundary can be estimated from the scattering coefficients as discussed in the '063 patent based on the reflection coefficient equation:

$$\sigma_{n+1} = \left[\frac{1+I}{1-I}\right]^2 \sigma_n. \quad (10)$$

However, in many applications this will be accurate only for the shallowest geo-electric boundary in a 1D horizontally-layered medium. Otherwise, significant errors may arise.

Step 510 generally represents the processing of raw time-series data, recorded at the receiver, into a form usable in the imaging methods described herein. For example, the processing can include transforming the time-series data to the frequency domain data using Fourier Transforms at select frequencies, stacking the data into spatial bins, analyzing and/or removing noise, and merging data with navigational information. In step 512 a suitable earth model is built according to general methods known in the art. For example, the building method can assume a uniform electrical property or some prior information about the formations from other data sets. Step 514 refers to the recursive nature of the method. Field data are commonly registered as source and receiver pairs, and simulations are commonly performed as combinations of a source and receiver location. If a survey contains a multiplicity of sources and receivers, the processing typically loops over each unique pair of sources and receivers individually. According to some embodiments, each step 520, 522, and 524 are repeated for individual source-receiver pairs at each frequency. To build the complete image, the steps 520, 522, and 524 are performed for every data pair in the dataset. Specifically, step 514 loops over all data pairs and frequencies and step 528 sums all these individual results into one image.

Note that FIG. 5 has been primarily described according to embodiments pertaining to frequency domain data. However, according to other embodiments, the steps of FIG. 5 are applied to time domain data as well. For example, according to some such embodiments, the correlation step 524 involves convolution in the time domain instead of multiplication in the frequency domain.

Iterative Imaging. As discussed in the '100 patent, for broad-band CSEM imaging and the '063 patent for narrow-band marine CSEM imaging, it is possible to develop an iterative scheme for crosswell and STB imaging. This is done by updating the propagation model (Step 512) based on the conversion of the resulting scattering coefficient maps from Step (528) into a new conductivity model. Then imaging steps 514, 520, 522, 524 and 528 are performed again with the result indicating conductivity contrast relative to the last iteration propagation model. In this way, the iterative imaging solution represents a solution to the full inverse problem (as long as true-amplitude imaging is performed) but without the difficulties of implementing stabilization and data or model parameter weighting.

Figure 3A:
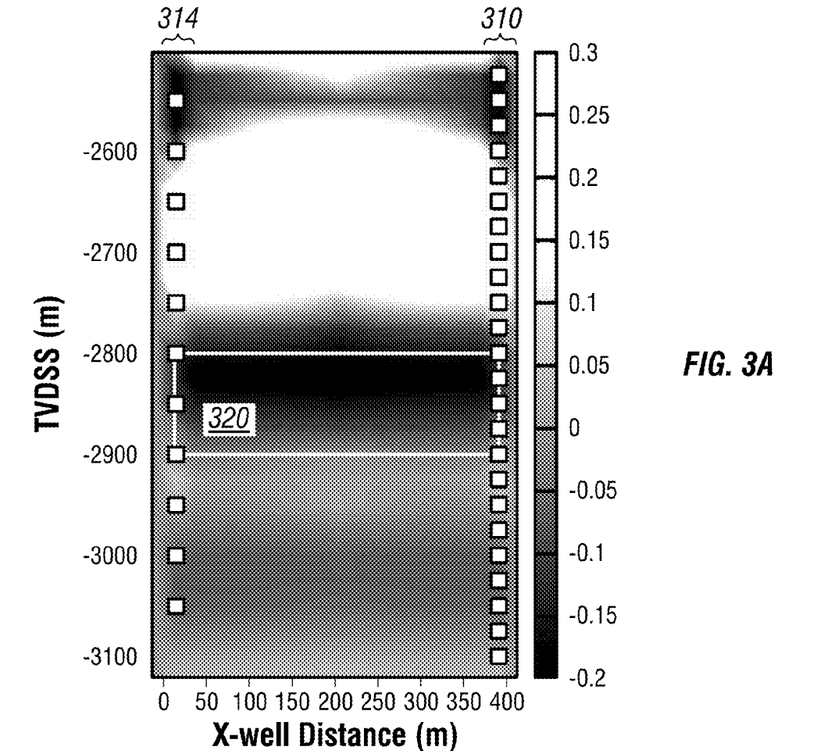
FIGS. 3a and 3b illustrate a crosswell CSEM model and synthetic imaging result using downward continuation and fullwave propagation schemes, according to some embodiments.
Figure 3B:
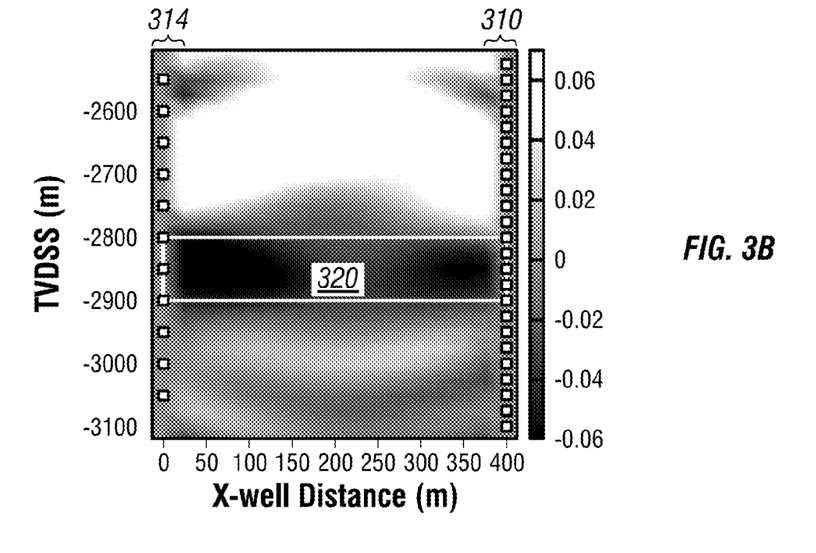

In order to demonstrate both fullwave and downward continuation imaging, two data examples using both downward continuation and fullwave schemes will now be described in further detail. A first example is for the crosswell configuration and a synthetic 1D earth model. FIGS. 3a and 3b illustrate a crosswell CSEM model and synthetic imaging result using downward continuation (FIG. 3a) and fullwave (FIG. 3b) propagation schemes. The source fields were generated with vertical magnetic dipoles sources 310 on the right side of FIGS. 3a and 3b. The sources 310 have 100.0 Hz and 300 Hz fundamental frequencies. Simulated data included z-polarized magnetic fields at both frequencies and a plurality of depths shown by receiver locations 314. A conductive formation 320, shown with the white black line, has a conductivity of 0.1 $\Omega$m between 2800 and 2900 m depths. In this case, there is a surface air layer (0.0 m) above a resistive 1.0 $\Omega$m overburden (0.0-2800 m) and an underburden below 2900 m is also at 1.0 $\Omega$m. Vertical magnetic fields were simulated for this model at 100 and 300 Hz and depths ranging from 2500 to 3100 m depths. The primary fields used in step 520 of FIG. 5 were simulated for a simple halfspace background of 1.0 $\Omega$m. Both solutions shown in FIGS. 3a (downward continuation scheme) and 3b (fullwave scheme) use a 1.0 $\Omega$m conductivity wholespace model for field propagations (Step 522 in FIG. 5); however, this method is implemented in general for 1D, 2D, or 3D starting models. It is clear from these results that the imaging scheme works well to recover the depth and relative contrast of the conductive layer at 2800 m depth which is denoted by negative coefficients in the image. Although we use only two frequencies for the imaging results in this example, in general, the use of a plurality of frequencies is desirable. According to some embodiments, however, only one frequency is used. In fact, the apparent resistor imaged above the conductor is an artifact of the finite bandwidth data (2 frequencies) used in the imaging. Additional limitations in image resolution are caused by an imperfect starting model (wholespace) and finite data coverage.

Figure 4:
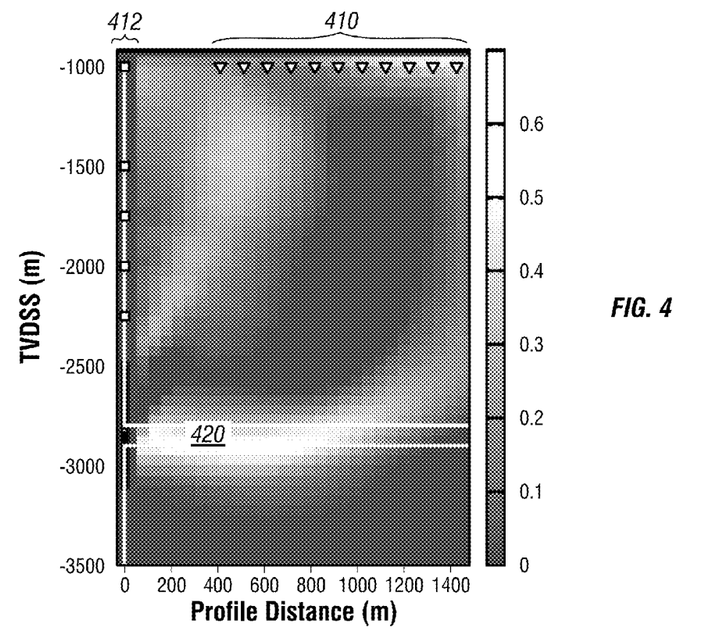
FIG. 4 illustrates a surface-to-borehole CSEM model and synthetic imaging result using a fullwave propagation scheme, according to some embodiments.

FIG. 4 illustrates a surface-to-borehole CSEM model and synthetic imaging result using a fullwave propagation scheme, according to some embodiments. In this second example, the source fields were generated by horizontal electric dipoles (black triangles 410) with a single 1.0 Hz fundamental frequency. Simulated data included z-polarized electric fields at 1 frequency and a plurality of depths (white squares 412). A resistive formation 420, shown as a solid white lines in images (30 $\Omega$m), was simulated in a relatively conductive background (1.0 $\Omega$m). For brevity, we only simulate surface-to-borehole configurations here, although the extension of these results to borehole-to-surface configurations is straight forward according to other embodiments. The source surface positions 410 where between 400 and 1400 m in x from the borehole (0.0 m). Simulated receivers 412 were positioned along the borehole at depths ranging from 1000 to 3500 m. The set contained approximately 2000 data. A simple 4-layer 1D model was used containing seawater (0.32 $\Omega$m), a conductive overburden (1.0 $\Omega$m), a resistive layer (30 $\Omega$m), and a conductive underburden (1.0 $\Omega$m). An image was generated using the fullwave solution and a simple wholespace starting model (1.0 $\Omega$m). The resulting image is shown in FIG. 4. For reference, source 410 and receiver 412 positions are shown at the seafloor and downhole. The true model is shown as a solid white line in the images. As with the crosswell results, the method accurately predicts a change in resistivity at the correct depth and approximate thickness. Note that the artifacts apparent in the images are caused by the lack of infinite signal bandwidth (i.e. only a single frequency), imperfect source-receiver coverage, and an imperfect imaging start model.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting. Further, the disclosure has been described with reference to particular preferred embodiments, but variations within the spirit and scope of the disclosure will occur to those skilled in the art. It is noted that the foregoing examples have been provided merely for the purpose of explanation and are in no way to be construed as limiting of the present disclosure. While the present disclosure has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method of analyzing electromagnetic survey data comprising:
receiving electromagnetic survey data of a subterranean formation obtained using at least a first downhole transceiver deployed in a borehole and a second transceiver, the electromagnetic survey data including an incident wave component and a scattered wave component; and
correlating the incident and scattered components so as to generate an image of the subterranean formation indicating spatial locations of one or more features in the formation using a processor, the image being based at least in part on one or more interference patterns of the incident and scattered wave components;
wherein the correlating includes generating a simulation of the incident wave component propagated into the formation;
wherein the correlating includes multiplying in the frequency-domain the simulated propagated incident wave component with the scattered wave component.

2. A method according to claim 1 wherein the features are resistivity variations.

3. A method according to claim 1 wherein the correlating includes convolving in the time-domain the simulated propagated incident wave component with the scattered wave component.

4. A method according to claim 1 wherein the simulation of the propagation into the formation is performed using an analytic continuation.

5. A method according to claim 1 wherein the simulation of the propagation into the formation is performed using a full-wave simulation.

6. A method according to claim 1 wherein the electromagnetic survey data primarily includes a plurality of frequency ranges between about 0.1 Hz and 3kHz.

7. A method according to claim 6 wherein the plurality of frequency ranges is between 1 and 15 individual frequencies.

8. A method according to claim 1 wherein the first transceiver is an electromagnetic receiver.

9. A method according to claim 8 wherein the receiver includes electrodes deployable downhole.

10. A method according to claim 8 wherein the receiver includes a magnetic field sensor deployable downhole.

11. A method according to claim 10 wherein the magnetic field sensor includes one or more induction coils.

12. A method according to claim 10 wherein the magnetic field sensor is a fluxgate magnetometer.

13. A method according to claim 10 wherein the magnetic field sensor is a superconducting quantum interference device.

14. A method according to claim 1 wherein the second transceiver is an electromagnetic transmitter adapted and configured to be deployable downhole in a second borehole.

15. A method according to claim 14 wherein the second transceiver is a transmitter adapted and configured to be deployable on land.

16. A method according to claim 14 wherein the second transceiver is a transmitter adapted and configured to be deployable in water in a marine environment.

17. A method according to claim 1 wherein the first transceiver is a transmitter and the second transceiver is a receiver adapted and configured to be deployable downhole in a second borehole.

18. A method according to claim 1 wherein the first transceiver is a transmitter and the second transceiver is a receiver adapted and configured to be deployable on land.

19. A method according to claim 1 wherein the first transceiver is a transmitter and the second transceiver is a receiver adapted and configured to be deployable in water in a marine environment.

20. A system for analyzing electromagnetic survey data comprising:
a processing system configured and programmed to receive electromagnetic survey data of a subterranean formation obtained using at least a first downhole transceiver deployed in a borehole and a second transceiver, the electromagnetic survey data including an incident wave component and a scattered wave component, and to correlate the incident and scattered components so as to generate an image of the subterranean formation indicating spatial locations of one or more features in the formation, the image being based at least in part on one or more interference patterns of the incident and scattered wave components;
wherein the correlation includes generating a simulation of the incident wave component propagated into the formation;
wherein the correlating includes multiplying in the frequency-domain the simulated propagated incident wave component with the scattered wave component.

21. A system according to claim 20 wherein the features are resistivity variations.

22. A system according to claim 20 wherein the correlation includes convolving in the time-domain the simulated propagated incident wave component with the scattered wave component, and the simulation of the propagation into the formation is performed using an analytic continuation.

23. A system according to claim 20 wherein the correlation includes convolving in the time-domain the simulated propagated incident wave component with the scattered wave component, and the simulation of the propagation into the formation is performed using a fullwave simulation.

24. A system according to claim 20 further comprising a downhole deployable electromagnetic receiver used as the first downhole transceiver.

25. A system according to claim 24 wherein the electromagnetic receiver includes electrodes deployable downhole.

26. A system according to claim 24 wherein the electromagnetic receiver includes a magnetic field sensor deployable downhole of a type selected from the group consisting of induction coils sensors, fluxgate magnetometers, and superconducting quantum interference devices.

27. A system according to claim 20 further comprising:
an electromagnetic receiver adapted and configured to be deployable downhole; and
an electromagnetic transmitter adapted and configured to be deployable downhole in a second borehole, wherein the first transceiver is the electromagnetic receiver and the second transceiver is the electromagnetic transmitter.

28. A system according to claim 20 further comprising:
an electromagnetic receiver adapted and configured to be deployable downhole; and
an electromagnetic transmitter adapted and configured to be deployable on land, wherein the first transceiver is the electromagnetic receiver and the second transceiver is the electromagnetic transmitter.

29. A system according to claim 20 further comprising:
an electromagnetic receiver adapted and configured to be deployable downhole; and
an electromagnetic transmitter adapted and configured to be deployable in water in a marine environment, wherein first transceiver is the electromagnetic receiver and the second transceiver is the electromagnetic transmitter.

30. A system according to claim 20 further comprising:
an electromagnetic transmitter adapted and configured to be deployable downhole; and
an electromagnetic receiver adapted and configured to be deployable downhole in a second borehole, wherein the first transceiver is the electromagnetic transmitter and the second transceiver is the electromagnetic receiver.

31. A system according to claim 20 further comprising:
an electromagnetic transmitter adapted and configured to be deployable on land; and
an electromagnetic receiver adapted and configured to be deployable downhole in a second borehole, wherein the first transceiver is the electromagnetic transmitter and the second transceiver is the electromagnetic receiver.

32. A system according to claim 20 further comprising:
an electromagnetic transmitter adapted and configured to be deployable in water in a marine environment; and
an electromagnetic receiver adapted and configured to be deployable downhole in a second borehole, wherein the first transceiver is the electromagnetic transmitter and the second transceiver is the electromagnetic receiver.

33. A system according to claim 20 wherein the electromagnetic survey data primarily includes a plurality of frequency ranges between about 0.1 Hz and 3 kHz.

34. A system according to claim 33 wherein the plurality of frequency ranges between 1 and 15 individual frequencies.

* * * * *